United States Patent
Cai et al.

(10) Patent No.: US 8,126,123 B2
(45) Date of Patent: Feb. 28, 2012

(54) PRE-BILLER IN INTERNET PROTOCOL MULTIMEDIA SUBSYSTEM (IMS) CHARGING GATEWAY FUNCTION (CGF)

(75) Inventors: Yigang Cai, Naperville, IL (US); Yile Enoch Wang, Freehold, NJ (US)

(73) Assignee: Alcatel Lucent, Paris (FR)

( * ) Notice: Subject to any disclaimer, the term of this patent is extended or adjusted under 35 U.S.C. 154(b) by 1402 days.

(21) Appl. No.: 11/711,545

(22) Filed: Feb. 27, 2007

(65) Prior Publication Data
US 2008/0205614 A1   Aug. 28, 2008

(51) Int. Cl.
*H04M 15/00* (2006.01)
*H04M 11/00* (2006.01)
(52) U.S. Cl. .......... 379/114.03; 379/126; 456/406
(58) Field of Classification Search .......... 379/114.01, 379/114.03, 114.2, 121.04, 126; 455/405–408
See application file for complete search history.

(56) References Cited

U.S. PATENT DOCUMENTS

| | | | | |
|---|---|---|---|---|
| 6,731,730 | B1 * | 5/2004 | Zolotov | 379/126 |
| 7,010,104 | B1 | 3/2006 | Cai et al. | |
| 2003/0130914 | A1 * | 7/2003 | Cinotti et al. | 705/34 |
| 2007/0036312 | A1 * | 2/2007 | Cai et al. | 379/126 |

OTHER PUBLICATIONS

3GPP TS 32.240, V.7.1.0 (Dec. 2006) (Third Generation Partnership Project).

\* cited by examiner

*Primary Examiner* — Quoc D Tran
(74) *Attorney, Agent, or Firm* — Werner Ulrich

(57) ABSTRACT

This invention relates to apparatus and a method for assembling and coordinating call data records from a plurality of network elements of an Internet Protocol Multimedia System call to generate charging information. A pre-biller stores an integrated charging record and accesses a rating engine to obtain the charging information to complete a charging data record. Advantageously, the information from a plurality of network elements is integrated into a combined charging data record.

6 Claims, 2 Drawing Sheets

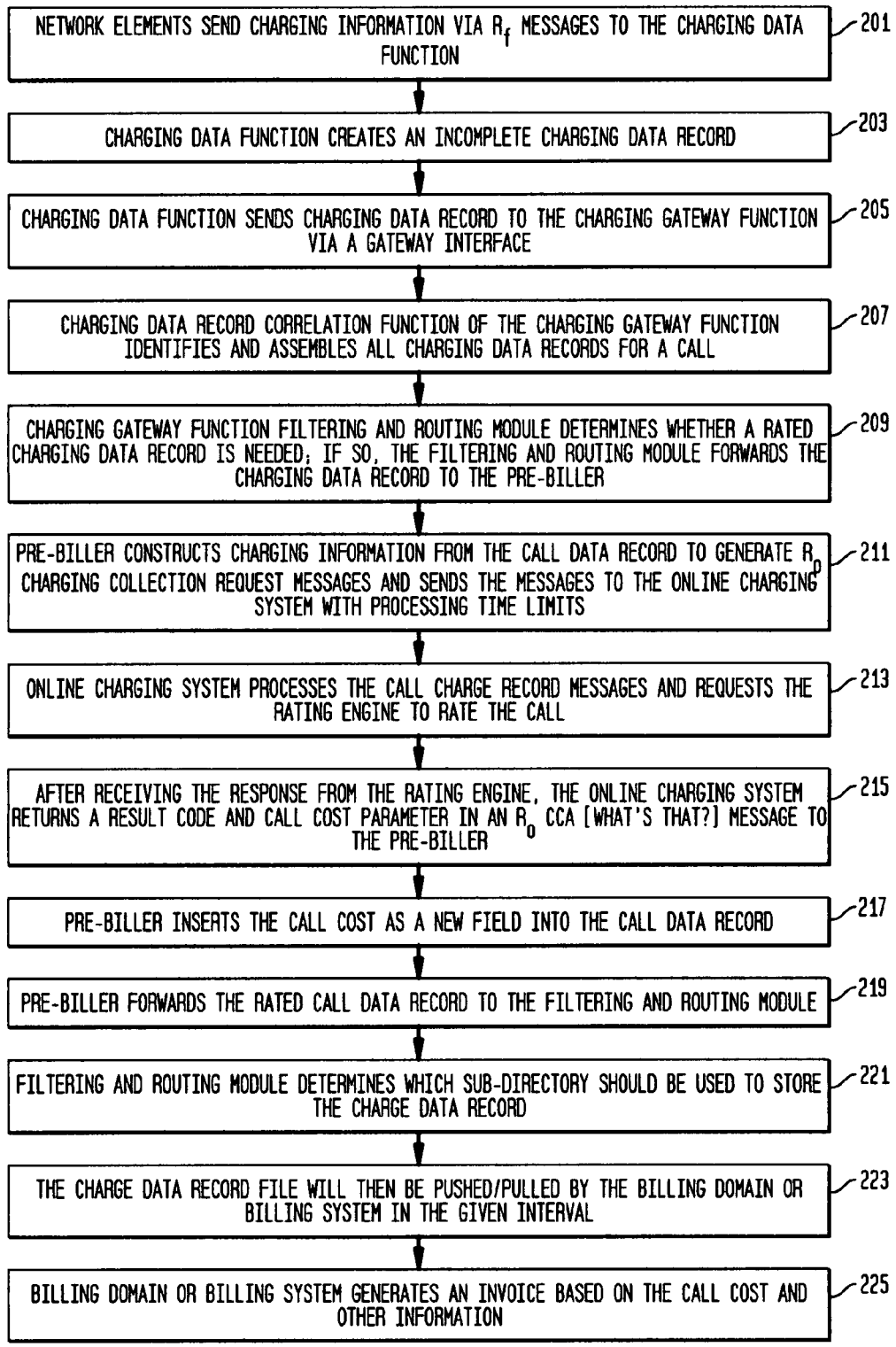

PRE-BILLER IN INTERNET PROTOCOL MULTIMEDIA SUBSYSTEM (IMS) CHARGING GATEWAY FUNCTION (CGF)

TECHNICAL FIELD

This invention relates to a method and apparatus for performing the charging function for Internet Protocol (IP) Multimedia Subsystem (IMS).

BACKGROUND OF THE INVENTION

This document describes a method and apparatus for enhancing the charge collection function, using third generation telecommunication systems as an example.

The introduction of the third Generation Partnership Project (3GPP) and the third Generation Partnership Project 2 (3GPP2) harmonization effort known as IP (Internet Protocol) Multimedia Sub-system (IMS) has introduced new convergence network elements based on IP based signaling protocols and bearer connections. The goal is to create a harmonized wireless and wireline IP based control network for telecommunications. The IMS network elements include the Proxy-Call Session Control Function (P-CSCF), Interrogating-CSCF (I-CSCF), Serving-CSCF (S-CSCF), Media Gateway Control Function (MGCF), the Breakout Gateway Control Function (BGCF), the Media Resource Function Controller (MRFC), and Application Servers (AS). In order to perform charging functions in the converged IMS network, each of the network elements have a defined interface to a new element called the Charging Collection Function (CCF). CCF, defined in 3GPP (Release 5) and 3GPP2 standards documents, is an off-line charging network element in the IMS network. CCF collects session charging information from IMS elements, and constructs and formats Charging Data Records (CDRs). It provides intermediate data storage buffering and provides a mechanism to transfer charging information to the operator's billing system (BS).

For IMS, the CCF provides the mechanism to transfer charging information from the IMS elements to the operator's chosen Billing System(s). The CCF is responsible for the collection of session charging information from the IMS elements. The CCF may also act as an intermediate data storage device and therefore needs to support storage of CDRs for a specified period of time given a usage profile. Further, the CCF in 3GPP standards must create ASN.1 (Abstract Syntax Notation.1) base Charging Detail Records. These CDRs are transferred to the BS/BMD (Billing Mediation Device) nominally using FIP (File Transfer Protocol), but other protocols and transport methods are possible. The CCF can receive data from the IMS elements in a near real-time mode. It should have enough storage to enable it to transmit the collected charging data to the BS in file mode. The CCF may support several transmission protocols towards the BS. One of the purposes for the CCF is to reduce the number of different interfaces between the BS and the IMS elements sending charging data.

In the IMS system, on-line charging is conducted by an Online Charging Server (OCS). IMS elements query the OCS in real-time with charging information. The OCS rates calls with a built-in rating engine and provides credit control for the session. The OCS also generates CDRs when a call is terminated. The OCS can support both prepaid and postpaid modes.

3GPP and 3GPP2 are generalizing the aforementioned IMS charging architecture to the entire 3G network, which includes Circuit Switch and Packet Switch networks.

However, there are no standards (neither in 3GPP nor 3GPP2) which support the charging and rating concept in CCF so that it cannot provide call cost in CDRs. All rating and billing information must be processed in a back office billing system. That limits the capability of IMS/CCF to postpaid and offline billing only.

U.S. Pat. No. 7,010,104, issued on Mar. 7, 2006, relates to a preliminary concept of the pre-biller which resides in the CCF. The CCF can collect charging information from a Charging Data Record (CDR) and construct a Diameter $R_o$ Credit Control Request (CCR) message to any rating engine to rate the call. The pre-biller will insert received call cost as a new parameter in CDR which can be pulled by the Billing System. However, the patent did not provide information as to when and how the pre-biller function can be operated and executed, and which CDR can be rated via the pre-biller.

The IMS offline charging architecture is changed in 3GPP Release 6 and Release 7 standards. The CCF function is upgraded to a Charging Data Function (CDF) and a Charging Gateway Function (CGF). The CDF interfaces with network elements to receive charging information via Diameter $R_f$ message and create Charging Data Record (CDR) per session (call) per network element, which results in multiple CDRs per session; many network elements may be involved in the session and all send charging information to the CDF. The CGF is a gateway between the CDF and BS/BMD to re-process and store the CDRs.

A problem of the prior art is that since a CCF based pre-biller cannot correlate multiple CDRs in one session because network elements may send charging information to multiple CCFs in the IMS network. A CCF based pre-biller may not have sufficient charging information from one CDR to construct a correct CCR message to the OCS to rate the call.

SUMMARY OF THE INVENTION

Applicants have carefully studied the prior art and have concluded that a more closely integrated system would be commercially desirable. The CGF should become a natural place to implement pre-biller capability when the CGF can optionally correlate multiple CDRs in one session (call) into a single CDR which contains complete charging information for the pre-biller to rate the call. Also, the CGF CDR file filtering function determines which CDR (non-correlated or correlated) should be inserted with call cost based on policy management rules.

Accordingly, Applicants have discovered a method and apparatus for integrating the charging process for IMS by utilizing the charging gateway function (CGF) to bring together the various charge data records produced by individual network elements involved in an IMS telecommunications session and sending these from a pre-biller to an online charging system or a billing system for rating the call. Advantageously, this arrangement pulls together all charging data for one session, and rates and bills calls in an integrated process.

In accordance with one preferred embodiment of Applicants' invention, a charging data record correlation function assembles all charging data records of a call session and, under the control of a charging data record filtering and routing function, sends these records to a pre-biller or, if no rating is required, directly to a billing system. The pre-biller sends rating requests to a rating engine in the online charge system, in a billing system, or a stand-alone rating engine. The rating engine rates the call and sends the rating result (call cost) back to the pre-biller. The pre-biller inserts the call cost into the CDR. Under the control of the charging data record filtering and routing function, the rated CDR is routed to the selected appropriate file management system and will be pulled/pushed to the billing system or other mediation device.

The CCR of the prior art is a credit control request, a Diameter $R_o$ message from the pre-biller to the OCS. In the prior art the pre-biller in CCF constructs the CCR message using the charging information from the CDR. In this invention, the pre-biller function in CGF constructs the CCR message using the charging information from the correlated CDR. Although the CCR itself has no change, the charging information contained in a CCR message is more complete.

BRIEF DESCRIPTION OF THE DRAWINGS

FIG. 2 is a flow diagram illustrating the processing of charge records for a call.

DETAILED DESCRIPTION

Figure 1:
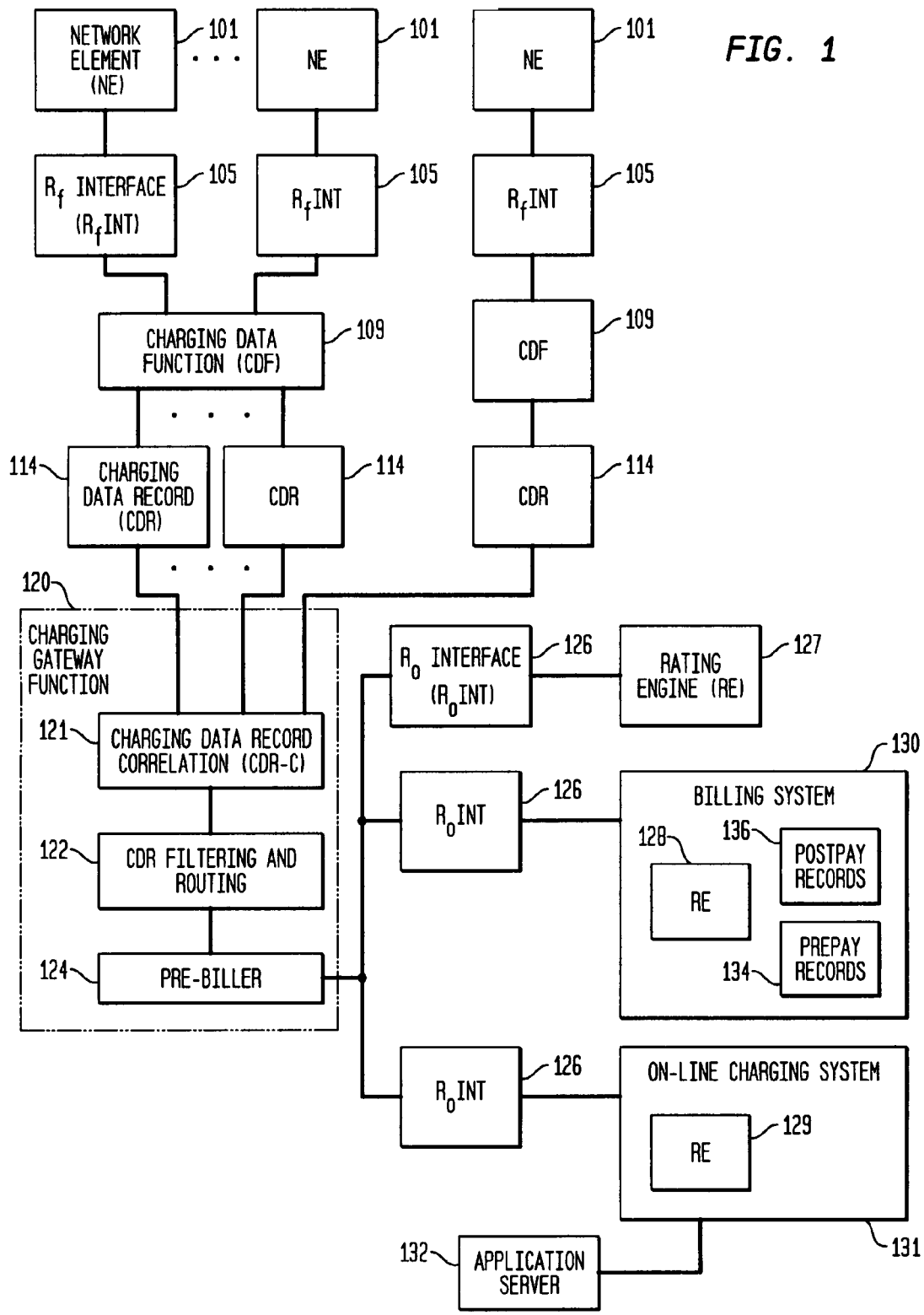
FIG. 1 is a block diagram illustrating the operation of Applicants' invention.

FIG. 1 is a block diagram illustrating the operation of Applicants' invention. Call sessions are initiated at one or more network elements 101. Network elements include the Proxy-Call Session Control Function (P-CSCF), Interrogating-CSCF (I-CSCF), Serving-CSCF (S-CSCF), Media Gateway Control Function (MGCF), the Breakout Gateway Control Function (BGCF), the Media Resource Function Controller (MRFC), and Application Servers (AS).

The network elements each report via an $R_f$ interface 105 to a charging data function (CDF) 109. The charging data function builds up charging data records 114 for each network element which are passed to a charging gateway function (CGF) 120 in one session (call). The CGF may receive multiple CDRs from one or multiple CDFs.

The charging gateway function includes a charging data record correlation function for assembling all charging data records associated with a session (call); the CDF may generate multiple CDRs for one session; this requires the CGF to correlate the multiple CDRs into a single CDR. The charging gateway function also includes a charging data routing and filtering function 122 for properly treating each such single CDR. Those charging data records which require a determination of a call cost are found by the filtering and routing function module and are sent to a pre-biller 124 along with an indication of the timing required for getting a rating engine response. The pre-biller communicates via a Diameter $R_o$ interface 126 with a rating engine 128 which may be located within the billing system or with a rating engine 129 in the OCS, or with a stand-alone rating engine 127.

The function of a pre-biller is to provide call cost information and at the appropriate time pass the charging data record including the call cost information to the appropriate sub-directory and/or appropriate peripheral for billing invoice.

Network elements are physical or program-controlled functional (non-physical) entities such as the Proxy-Call Session Control Function (P-CSCF), Interrogating-CSCF (I-CSCF), Serving-CSCF (S-CSCF), Media Gateway Control Function (MGCF), the Breakout Gateway Control Function (BGCF), the Media Resource Function Controller (MRFC), and Application Servers (AS). An $R_f$ interface is a Diameter reference point for offline charging. A charge data function is a software module physically housed in an IMS charging system. A charging gateway function is a software module housed in an IMS charging system. The charging gateway function also houses the charging data record correlation function, the call data record routing and filtering module and the pre-biller. The Diameter $R_o$ interface is a reference point for online charging. A rating engine is a software module housed in a convenient processing system for providing information for calculating charges for a particular call session; the information would include such items as initial charges, charges for additional minutes, and special charges for special media services such as video. The rating engine can provide such information based on the identity and location of the parties involved in the call session.

The online charge system is a processing system for generating prepay and post-pay records in real time. In this embodiment, the online charging system also provides a rating engine 128 to rate the CDR from the pre-biller of the CGF for offline charging call CDRs.

The online charging system can also be connected to one or more application servers 132. One of these application servers can be used to supply almost immediate information to hotel/motel charging systems.

FIG. 2 is a flow diagram illustrating the operation of Applicants' invention including the software modules involved. A call session starts and all network elements involved in the call session send charging information via $R_f$ messages to the charging data function (action block 201). The charging data function creates one or more charging data records (action block 203), in general, one record for inputs from each network element involved in the call. The charging data function then sends charging data records to the charging gateway function via a Ga interface (action block 205).

The charging data record correlation function in the charging gateway function identifies and assembles all charging data records associated with a call (action block 207).

The charging gateway function filtering and routing module determines whether a rated call data record is needed. Some of the basic rules for determining by the filter function whether a CDR should be rated are the following:

1. Call types (e.g., free calls (U.S. 800 calls) need not be rated);
2. Service types (e.g., local calls from stations that receive unlimited local service in return for a higher monthly bill);
3. Content types (e.g., Voice, SMS/MMS, video)
4. Application server information (e.g., Calling Card, virtual private network (VPN) call);
5. Media information (e.g., wireless or video calls are usually rated);
6. Calling and called party numbers (e.g., virtual private line service calls usually need not be rated);
7. Hot billing calls (e.g., hotel/motel calls require immediate rating);
8. Calls for lines being observed may have to be rated;
9. For Mobile Virtual Network Operator (MVNO) calls, a back-office operation may pull the CDRs directly from the CGF and have the CDR rated.

If rating is required, the filtering and routing module forwards the charge data record to the pre-biller (action block 209).

The pre-biller then constructs Diameter $R_o$ Credit Control Request (CCR) messages from the charge data record and sends these messages to the online charge system along with an indication of the time limit for a response (action block 211). The rating information includes information such as the initial charge, charge per minute, and special charges for particular media of the session. The online charge system processes the CCR messages and requests a rating engine to rate the call. The online charge system requests the rating within the time limit (action block 213). The online charge system then returns the result code and the call cost parameters determined by the rating engine in an $R_0$ Credit Control Answer message to the pre-biller (action block 215). The pre-biller inserts the call cost found in the Credit Control Answer message as a new field into the charging data record (action block 217). The pre-biller forwards the rated charging data record to the filtering and routing module (action block 219). The filtering and routing module determines which sub-directory the charging data record is to be filed and routes the charging data record toward that file (action block 221). The charging data record file will then be pushed/pulled by the billing domain or billing system within the given time interval (action block 223). The billing domain or billing system then generates an invoice based on the call cost of the call data records associated with a particular customer in a non-real-time mode. In some cases, the charging data record file will be sent to an application server which processes the CDR to generate a billing invoice; for example, hotel/motel billing application servers process CDRs in a near real-time mode to generate a billing invoice.

In some cases, the filtering function may file a CDR in more than one directory. For example, if the call involves wireline and wireless connections, entries may be required in both sub-files.

The above description is of one preferred embodiment of Applicants' invention.

We claim:

1. In a telecommunications network, apparatus for performing the processing of online and offline billed telecommunications calls, comprising:

means, responsive to receipt of a telecommunications call session, involving a plurality of network elements, for building up a plurality of charging data records that are missing call cost data;

means, responsive to said building up a plurality of charging data records, for sending said charging data records to a charge gateway function for providing said missing call cost data;

said charging gateway function for transmitting charging data records including said missing call cost data to a billing system;

said charging gateway function comprising a pre-billing module, and a charge data record routing and filtering module, and a charging data record correlation function;

said charging data record correlation function for assembling all charging data records pertaining to one call into a single charging data record;

said routing and filtering module for determining whether rating information is needed and for requesting said pre-billing module to request said rating information;

said pre-billing module for requesting rating information from a rating engine and for completing said charging data record in response to receipt of said rating information;

said routing and filtering module for routing completed charging data records to appropriate files of a billing system.

2. The apparatus of claim 1 further comprising:

means for routing charging data to an application server for assembling immediate charges.

3. The apparatus of claim 1 in which said rating engine is in said billing system.

4. The apparatus of claim 1 further comprising an online charging system for generating pre-pay and post-pay charging records in real time;

said charging gateway function further for transmitting charging data records to an on-line charging system.

5. The apparatus of claim 4 wherein said rating engine is in said online charging system.

6. The apparatus of claim 1 in which said rating engine is a stand-alone unit.

\* \* \* \* \*